United States Patent Office 3,825,627
Patented July 23, 1974

3,825,627
ETHYLENE POLYMER COMPOSITION HAVING
ENHANCED PHOTODEGRADABILITY
Michael C. McGaugh, Angleton, Tex., assignor to The
Dow Chemical Company, Midland, Mich.
No Drawing. Continuation-in-part of application Ser. No.
160,139, July 6, 1971. This application May 30, 1972,
Ser. No. 257,831
Int. Cl. C08f 15/04
U.S. Cl. 260—897 A
14 Claims

ABSTRACT OF THE DISCLOSURE

Photodegradability of ethylene polymer containing a photosensitizing material such as tris(N,N-di-n-butyldithiocarbamato)iron (III) is enhanced by incorporating therein a minor amount of polypropylene. The resultant photodegradable blends are useful as molding or extrusion compositions for the production of disposable plastic articles, e.g., wrappings, containers, etc., which degrade rapidly when exposed to sunlight and other ultraviolet light sources.

CROSS-REFERENCE TO RELATED APPLICATION

This invention is a continution-in-part of application Ser. No. 160,139 filed July 6, 1971.

BACKGROUND OF THE INVENTION

This invention relates to ethylene polymer compositions and articles fabricated therefrom which degrade rapidly when exposed to ultraviolet light.

Ethylene polymers are widely utilized in the fabrication of relatively light weight, disposable articles having excellent flexibility over a wide range of temperatures and exhibiting chemical inertness toward aqueous and nonaqueous liquids.

As a result of their widespread utility in the production of disposable articles, particularly in the packaging field, and as a result of their physical properties which enable them to withstand long exposure to the elements before they are decayed or degraded, the careless discard of such articles of ethylene polymers creates a real litter problem for the ecology of populated areas. Such articles must be collected and burned, thereby possibly polluting the air, or allowed to remain where they are used and discarded, thereby littering the landscape.

It is therefore highly desirable to provide ethylene polymer compositions which would degrade more rapidly upon exposure to the elements than conventional ethylene polymer compositions. Yet it is also desirable that articles of such degradable compositions substantially retain the good physical properties initially in order that they perform the primary function for which they were produced.

SUMMARY OF THE INVENTION

Accordingly, the present invention is a photodegradable ethylene polymer composition which substantially retains the physical properties of the ethylene polymer during fabrication and normal usage, but, upon exposure to sunlight and other ultraviolet light sources, such composition degrades at a much faster rate than the conventional ethylene polymer. As a result of such rapid degradation, articles of said degradable compositions embrittle and are readily broken up by normal forces of the environment.

The novel compositions of the present invention comprise a predominant amount of ethylene polymer and amounts of a photosensitizing material for the ethylene polymer and propylene polymer sufficient to accelerate degradation of the ethylene polymer upon exposure to ultraviolet light.

In another aspect, the present invention is a method of using the aforementioned composition which method comprises fabricating a shaped article of said composition and exposing said article to conditions of ultraviolet light and the like such that said article is degraded to the point of embrittlement.

It has been found that compositions of ethylene polymer and photosensitizing material degrade at a more rapid rate than the pure ethylene polymer. Above a certain relatively low concentration (so-called "maximum effective concentration") of the photosensitizing material in the ethylene polymer, the rate of degradation is not appreciably increased by the incorporation of more photosensitizing material into the ethylene polymer. Surprisingly, however, the incorporation of propylene polymer into the ethylene polymer containing maximum effective concentration of photosensitizing material does substantially increase the rate of degradation of the ethylene polymer containing said photosensitizing material.

The novel degradable compositions of the present invention are particularly useful as molding and extrusion compositions for the production of any disposable article conventionally produced from polyethylene and other ethylene polymers. Exemplary disposable articles include containers such as cups, bags, cartons, tubs, bowls, pots and baskets; mulch films for use in agriculture; wrapping films; boxes and the like.

DESCRIPTION OF THE PREFERRED EMBODIMENTS

The preferred compositions of the present invention comprise a predominant amount of ethylene polymer, a minor amount of propylene polymer and an amount of photosensitizing material sufficient to measurably enhance photodegradability of the ethylene polymer without having a substantial, deleterious effect on physical properties of the ethylene polymer prior to exposure to ultraviolet light. Exemplary preferred compositions comprise at least about 75 weight percent of ethylene polymer based on total polymer, from about 1 to about 25 weight percent of propylene polymer based on total polymer and from about 25 to about 25,000 parts per million of a photosensitizing material based on the ethylene polymer. Especially preferred compositions comprise at least about 85 weight percent of ethylene polymer, from about 5 to about 15 weight percent of propylene polymer and from about 25 to about 2500 parts per million of a photosensitizing material based on the ethylene polymer. It is further understood that polymers containing high loadings, e.g., 25,000 p.p.m. and higher, of photosensitizing material may be used in combination with polymer containing no photosensitizing material to produce a degradable composition having the optimum concentration of photosensitizing material. Concentrates of polypropylene in ethylene polymer can be similarly employed.

By "ethylene polymer" is meant normally solid ethylene polymer suitable for molding or similar fabrication and includes the high and low density homopolymers of ethylene and copolymers of ethylene in predominant amount with minor amounts of other copolymerizable aliphatic α-olefins having from 3 to 18 carbon atoms, and mixtures and blends thereof. Such ethylene polymers preferably have melt indexes as determined by ASTM D-1238-65T(E) in the range of from about 0.1 to about 50 decigrams/minute and densities in the range of from about 0.910 to about 0.990 grams/cubic centimeter. Methods for the preparation of such ethylene polymers are well known in the art as taught by Schildknecht, Polymer Processes, Vol. X (1956).

Polymers of propylene suitably employed in the practice of this invention include homopolymers of propylene and copolymers of propylene and ethylene and/or other ethylenically unsaturated monomers, particularly, the α-monoolefins having 4–18 carbon atoms. Most beneficial propylene polymers are those wherein the polymerized propylene moiety constitutes at least about 50 weight percent of the polymer, said polymers having molecular weight within the range of from about 10,000 to about 1,000,000. Preferably, homopolymers of propylene, inclusive of the atactic, isotactic and syndiotactic varieties, are employed. An especially preferred polypropylene is isotactic polypropylene having a melt flow rate in the range of from about 1 to about 20 decigrams/minute as determined by ASTM D-1238-65T(L) and density in the range of from about 0.860 to about 0.920 grams/cubic centimeter. Methods for preparing such propylene polymers are well known as disclosed in Schildknecht, Polymer Processes, Vol. X (1956).

By photosensitizing material is meant any material known to become activated to catalysts in the presence of ultraviolet light and act to promote the degradation of ethylene polymers containing them upon exposure to outdoor weathering. Any material of this type which does not adversely affect the other desirable properties of the ethylene polymer compositions of this invention is suitable within the scope of the present invention. Such materials include agents which promote oxidation of hydrocarbons and/or which, when activated by the action of ultraviolet light, tend to depolymerize or degrade the ethylene polymers which contain them.

Preferred photosensitizing materials include photosensitive aromatic ketones having from 8 to 40 carbon atoms such as 1,5-dihydroxyanthraquinone, anthraquinone, phenolphthalein, benzophenone, anthrone, metahydroxybenzophenone, para-hydroxybenzophenone, and the like; photosensitive aromatic ammonium compounds such as methylene blue and alizarin cyanine green; photosensitive aliphatic ketones having from about 6 to about 40 carbon atoms such as hexanone, octanone, dodecanone and the like; photosensitive aliphatic and aromatic aldehydes having from about 6 to about 40 carbon atoms such as heptaldehyde, capronaldehyde, benzaldehyde, salicylaldehyde and the like.

Especially preferred photosensitizing materials are the nonionic photosensitive organo complexes of the heavy metals, i.e., those having atomic numbers greater than 21 and exclusive of the metals of Groups 1a, 2a and 3b of the Periodic Table of Elements of Mendeléeff as set forth in the Handbook of Chemistry and Physics, 48th Edition, The Chemical Rubber Co. (1967–1968). By a photosensitive complex is meant a complex possessing the characteristic of being activatable by ultraviolet light to form a photo-oxidatively active form of said metal which thereby catalyzes the degradation of the polymer. The metal present in the complex is preferably iron, zinc, copper, lead and tellurium with other metals such as, for example, cobalt, nickel, manganese, silver, palladium, molybdenum, chromium, tungsten and cerium and the like being suitable. The organo group forming the remainder of the complex is preferably dithiocarbamate with such groups as dithiophosphate also being suitable.

Representative preferred complexes are the heavy metal dithiocarbamates having the general formula:

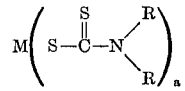

wherein R is a hydrocarbon radical, preferably alkyl, having from 1 to 18 carbon atoms, $a$ is a whole number corresponding to valence of M and M is a heavy metal as defined hereinbefore. The hydrocarbon radicals may be the same or different groups in a single complex, e.g., alkyl, aralkyl, aryl or cycloalkyl. Accordingly, it is possible that in a single complex containing four dithiocarbamato groups there may be as many as 8 different hydrocarbon radicals. Exemplary heavy metal carbamates are tris(N,N-di-n-butyldithiocarbamato)iron (III), tris-(N,N-dimethyldithiocarbamato)bismuth (III), bis(N,N-dimethyldithiocarbamato)copper (II), bis(N,N-dimethyldithiocarbamato) lead (II), tetrabis(N,N-diethyldithiocarbamato)tellurium (IV), bis(dimethyldithiocarbamato) zinc (II), bis(N,N-dipropyldithiocarbamato)nickel (II), bis(N,N-dihexyldithiocarbamato)cobalt (II), tris(dioctyldithiocarbamato)chromium (III), tris(N,N - dilauryldithiocarbamato)iron (III), tris(N,N - distearyldithiocarbamato)iron (III), tris(N,N - dibenzyldithiocarbamato)iron (III), tris(N,N-diphenyldithiocarbamato)iron (III), tris(N,N - dinaphthyldithiocarbamato)iron (III), bis(N-phenyl - N - benzyldithiocarbamato)(N-methyl-N-ethyldithiocarbamato)iron (III), tris(dicyclohexyldithiocarbamato)iron (III) and the foregoing carbamates of other heavy metals. Exemplary dithiophosphates which are suitable are represented by the general formula:

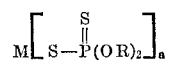

wherein R, M and $a$ are as defined hereinbefore.

It is understood that such photosensitizing materials are to be employed in amounts which accelerate degradation of the ethylene polymer even in the absence of polypropylene, but which do not deleteriously affect the initial physical properties of the ethylene polymer. It is further understood that, at certain high concentrations of photosensitizing material, addition of more photosensitizing material does not further accelerate degradation of the ethylene polymer and in some instances may even stabilize the polymer. Therefore, it is understood that amounts of photosensitizing material in excess of such a high concentration are generally not desirable to employ. While the numerical concentration required to satisfy these requirements varies with the particular photosensitizing material, concentrations of photosensitizing material in the range of from about 25 to about 15,000 p.p.m. based on the ethylene polymer are generally advantageous, with concentrations in the range of from about 25 to about 2500 p.p.m. being preferred. It is further understood that known stabilizers such as the dithiocarbamates of nickel and cobalt are most advantageously employed in quantities generally less than about 200 parts per million.

The photosensitizing material and the propylene polymer may be incorporated into the ethylene polymer in any order by any of the techniques known for blending a solid, a liquid or polymeric material with a polymer and solid or liquid component prior to fabrication into shaped articles. For example, the desired amount of photosensitizing material and propylene polymer can be dry blended with the polymer and, if desired, further blended on a high temperature mixing device such as a hot roll mill; or, the aforementioned ingredients in solution and/or dispersion can be admixed with a solution or dispersion of the ethylene polymer in a suitable solvent. The temperature of blending of the aforementioned ingredients with the ethylene polymer is not particularly critical so long as the thermal degration point of the ethylene polymer or the propylene polymer is not reached. It is further understood that blending should not be carried out under conditions such that the photosensitizer loses all of its photosensitizing properties.

In addition to the aforementioned critical ingredients, it is understood that optional additives such as plasticizers, fillers and the like can also be incorporated into the compositions of this invention.

The resultant ethylene polymer compositions of this invention are then fabricated by molding, extrusion and the like into any of a wide variety of shaped articles such as films for use in agriculture, e.g., so-called mulch films; disposable cartons and containers for packaging, e.g., disposable carriers or holders for canned and bottled beverages and other liquids, packaging films, and other applications of ethylene polymers wherein disposal of the polymeric remains is a problem.

Fabricated ethylene polymer compositions in accordance with this invention have relatively poor stability to ultraviolet light and within a predictable time in the presence of sunlight and other weathering conditions degrade to the extent that shaped articles of these compositions become discolored, hard and brittle, and eventually break and/or crumble into small particles.

The following examples are provided to illustrate the invention and should not be considered as limiting its scope. All parts and percentages are by weight unless otherwise indicated. Melt indexes of the ethylene polymers are determined in accordance with ASTM D–1238–65T(E) and melt flow rates of propylene polymers are determined in accordance with ASTM D–1238–65T(L).

Example 1

Several compositions (Sample Nos. 1–8) are prepared by dry blending polyethylene having a density of 0.920 g./cc. and melt index of 1 decig./min., polypropylene having a density of 0.890 g./cc. and a melt flow rate of 7 decig./min. and anthrone in the proportions specified in Table I. The resultant dry blended materials are then compounded in a polymer mixer at 450° F. for a period of 15 min. The resulting polymer specimens (test tabs 1½" x ½" x ¹⁄₁₆") are tested for degradability and the results are recorded in Table I.

For the purposes of comparison, several compositions (Sample Nos. $A_1$–$A_3$) are prepared in a manner similar to that of the preceding paragraph using the polyethylene and anthrone in proportions specified in Table I. These compositions are also tested for degradability and the results are recorded in Table I.

As a control composition (Sample No. $C_1$), polyethylene identical to that in the aforementioned compositions is worked in the polymer mixer at 450° F. for 15 min. and then tested for degradability. The result of this test is also recorded in Table I.

TABLE I

| Sample number | Additives | | Degradability, percent, elongation [3] time— | | | | |
|---|---|---|---|---|---|---|---|
| | Polypropylene,[1] percent | Anthrone,[2] p.p.m. | 0 week | 3 weeks | 6 weeks | 11 weeks | 17 weeks |
| 1 | 5 | 500 | 450 | 400 | 400 | 225 | 60 |
| 2 | 10 | 500 | 450 | 450 | 450 | 130 | 25 |
| 3 | 12,5 | 500 | 400 | 150 | 150 | 50 | 25 |
| 4 | 5 | 1,000 | 400 | 400 | 280 | 50 | 25 |
| 5 | 10 | 1,000 | 400 | 300 | 275 | 100 | 25 |
| 6 | 25 | 1,000 | 425 | 250 | 250 | 125 | 25 |
| 7 | 5 | 2,500 | 400 | 350 | 400 | 250 | 75 |
| 8 | 12,5 | 2,500 | 325 | 375 | 100 | 75 | 25 |
| A* | 0 | 500 | 450 | 400 | 400 | 300 | 100 |
| A* | 0 | 1,000 | 450 | 450 | 425 | 430 | 100 |
| A* | 0 | 2,500 | 400 | 350 | 400 | 375 | 100 |
| C* | 0 | 0 | 500 | 500 | 500 | 500 | 500 |

[1] Weight percent polypropylene based on total weight of polyethylene and polypropylene.
[2] Parts per million based on weight of polyethylene.
[3] Each sample test tab is exposed to identical outdoor weathering for the time indicated. Degradability is determined after the indicated period by measuring the percent elongation in accordance with ASTM D-638. For these tests, no attempt is made to measure elongation at values less than 25% because the accuracy of the test is substantially reduced below that point. At 25% elongation, the sample has very little physical integrity and as exposure continues the sample rapidly becomes brittle.

*Not an example of the invention.

Example 2

Several compositions as described in Example 1 are also tested for degradability using accelerated ultraviolet light exposure instead of outdoor weathering to achieve degradation. The results of these tests are recorded in Table II.

TABLE II

| Sample number | Additives | | Degradability, percent elongation [3] time— | | | | | | | | | |
|---|---|---|---|---|---|---|---|---|---|---|---|---|
| | Polypropylene,[1] percent | Anthrone,[2] p.p.m. | 0 days | 1 day | 2 days | 3 days | 6 days | 7 days | 8 days | 9 days | 10 days | 13 days |
| 1 | 5 | 500 | 500 | 450 | 400 | -- | 100 | 100 | 100 | 50 | 25 | -- |
| 2 | 10 | 500 | 500 | 500 | 450 | -- | 100 | 75 | 50 | 25 | 25 | -- |
| 4 | 5 | 1,000 | 450 | 450 | 400 | 250 | 100 | 100 | -- | 50 | 50 | 25 |
| 5 | 10 | 1,000 | 500 | 450 | 325 | 270 | 75 | 50 | 50 | 25 | 25 | 25 |
| 6 | 25 | 1,000 | 375 | 200 | 125 | 125 | 50 | 50 | 50 | -- | -- | 25 |
| 7 | 5 | 2,500 | 450 | 400 | 425 | 275 | 125 | 100 | 100 | 50 | 50 | 25 |
| $A_1$* | 0 | 500 | 450 | 400 | 400 | -- | 100 | 100 | 100 | 100 | 50 | -- |
| $A_2$* | 0 | 1,000 | 550 | 450 | 450 | 400 | 300 | 180 | 150 | 175 | 100 | 75 |
| $A_3$* | 0 | 2,500 | 500 | 400 | 400 | 375 | 375 | 75 | 125 | 100 | 75 | 50 |
| $C_1$* | 0 | 0 | 500 | 500 | 500 | 500 | -- | 500 | -- | -- | -- | -- |

[1],[2] Same as in Table I.
[3] Each sample test tab is exposed to identical ultraviolet light (275 watts) for the times indicated. Degradability is determined after the indicated period by measuring the percent elongation in accordance with ASTM D-638. No attempt is made to measure elongation at values less than 25% for reasons stated in [3] of Table I. A dash means no data are obtained under the conditions specified. Reslts are given as the average percent elongation for three test tabs.

*Not an example of the invention.

Example 3

Several compositions (Sample Nos. 9–12) are prepared using the polyethylene and the polypropylene of Example 1 and different photosensitizing materials as indicated in Table III. The compositions are prepared in the manner set forth in Example 1 and tested for degradability as in Example 2. The results of these tests are recorded in Table III.

For comparative purposes, compositions (Sample Nos. $A_4$–$A_7$) of the polyethylene and the photosensitizing materials are also prepared and tested for degradability, and the results are recorded in Table III.

A control sample ($C_1$) of the polyethylene is also tested for degradability and the results are recorded in Table III.

TABLE III

| Sample number | Polypropylene,[1] percent | Photosensitizing material,[2] p.p.m. | Species of photosensitizing material | Degradability[3] time in days for 50% loss of elongation |
|---|---|---|---|---|
| 9 | 10 | 25 | Fluorescein (Free acid)[a] | 4.0 |
| 10 | 10 | 2,500 | ____do[a] | 4.5 |
| 11 | 10 | 25 | Benzophenone | 6.5 |
| 12 | 10 | 2,500 | ____do | 6.0 |
| 13 | 10 | 25 | Methylene blue[b] | 3.5 |
| 14 | 10 | 2,500 | ____do[b] | 3.0 |
| 15 | 10 | 25 | Alizarine cyanine green[c] | 4.0 |
| 16 | 10 | 25 | Erythrosin, bluish[d] | 5.0 |
| 17 | 10 | 2,500 | Anthrone | 4.5 |
| A4* | 0 | 25 | Fluorescein (Free acid)[a] | 10 |
| A5* | 0 | 2,500 | ____do[a] | 8 |
| A6* | 0 | 25 | Benzophenone | 10 |
| A7* | 0 | 2,500 | ____do | 10 |
| A8* | 0 | 25 | Methylene blue[b] | 10 |
| A9* | 0 | 2,500 | ____do[b] | >10 |
| A10* | 0 | 25 | Alizaine cyanine green[c] | >10 |
| A11* | 0 | 25 | Erythrosin, bluish[d] | >10 |
| A12* | 0 | 2,500 | Anthrone | 7.5 |
| C1* | 0 | 0 | None | >10 |

[1,2] Same as in Table I.
[3] Percent elongation measured in accordance with ASTM D-638 with results given as the average percent elongation for three test tabs.
*Not an example of the invention.

[a] See the following formula: [b] Zinc double chloride of—

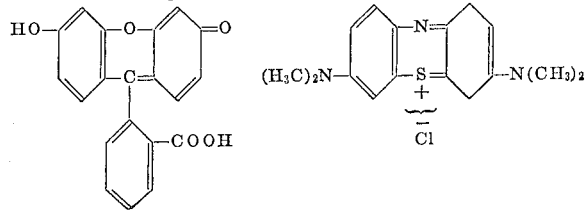

[c] See the following formula: [d] See the following formula:

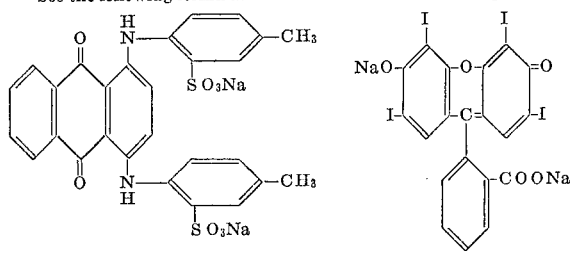

Example 4

Several compositions (Samples Nos. 1–7) are prepared by dry blending the polyethylene and polypropylene employed in Example 1 with tris(N,N-di-n-butyldithiocarbamato)iron (III) [TBDTCFe] in the proportions set forth in Table IV. The compositions are compounded by extrusion. The compositions are then molded into test tabs by the procedure of Example 1 and tested for degradability by the procedure of Example 2. The results are recorded in Table IV.

For purposes of comparison, several compositions (Sample Nos. $D_1$–$D_7$) are prepared in a manner similar to that described in the preceding paragraph using the polyethylene and TBDTCFe in proportions specified in Table IV. The compositions are also tested for degradability and the results are recorded in Table IV.

As a control composition (Sample No. $C_2$), polyethylene identical to that in the aforementioned compositions is compounded by extrusion and molded in the foregoing manner and then tested for degradability by the procedure of Example 2. The results are recorded in Table IV.

What is claimed is:

1. A photodegradable ethylene polymer composition comprising a predominant amount of a normally solid ethylene polymer having a predominant amount of ethylene and an amount of a photosensitive nonionic organo complex selected from the group consisting of heavy metal dithiocarbamates and heavy metal dithiophosphates having an atomic number greater than 21 exclusive of the metals of Groups 1a, 2a and 3b of Mendeléeff's Periodic Table of Elements and an amount of polypropylene, said amounts of organo complex and polypropylene being effective to accelerate degradation of the ethylene polymer upon exposure to ultraviolet light.

2. The photodegradable ethylene polymer composition according to Claim 1 comprising at least about 75 weight percent of the ethylene polymer selected from the group consisting of homopolymers of ethylene and copolymers of a predominant amount of ethylene with minor amounts of other copolymerizable aliphatic α-olefins having from 3 to 18 carbon atoms, from about 1 to about 25 weight percent of polypropylene and from about 25 to about 25,000 parts per million based on weight of said ethylene polymer of said organo complex.

3. The composition according to Claim 2 which contains a photosensitive aroamtic ketone having from 8 to 40 carbon atoms in addition to the organo complex of the heavy metal.

4. The composition according to claim 3 wherein the ketone is anthraquinone.

5. The composition according to claim 3 wherein the ketone is phenolthalein.

6. The composition according to Claim 1 wherein the organo complex is a photosensitive heavy metal dithiocarbamate having the formula:

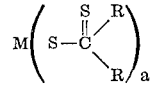

wherein R is a hydrocarbon radical, $a$ is a whole number corresponding to the valence of M and M is a heavy metal having an atomic number greater than 21 exclusive of the metals of Groups 1a, 2a and 3b of Mendeléeff's Periodic Table of Elements.

TABLE IV

| Sample No. | Additives | | Degradability, percent, elongation[3] time— | | | | | | | | |
|---|---|---|---|---|---|---|---|---|---|---|---|
| | Polypropylene,[1] percent | Complex concentration,[2] p.p.m. | 0 days | 1 day | 3 days | 5 days | 7 days | 9 days | 10 days | 13 days | 15 days |
| C2 | 0 | 0 | 470 | 490 | 500 | 510 | 510 | 450 | 400 | 190 | 100 |
| 1 | 1 | 25 | 500 | 525 | 482 | 110 | 85 | 70 | 60 | 45 | 25 |
| D1* | 0 | 25 | 500 | 505 | 505 | 220 | 95 | 75 | 70 | 45 | 25 |
| 2 | 1 | 100 | 560 | 540 | 540 | 105 | 78 | 50 | 40 | <25 | |
| D2* | 0 | 100 | 510 | 510 | 510 | 125 | 78 | 50 | 40 | <25 | |
| 3 | 1 | 500 | 560 | 525 | 495 | 87 | 50 | 25 | | | |
| D3* | 0 | 500 | 480 | 500 | 515 | 225 | 65 | 33 | 25 | | |
| 4 | 10 | 150 | 575 | 560 | 125 | 45 | 25 | | | | |
| 5 | 10 | 25 | 525 | 545 | 390 | 70 | 35 | 25 | | | |
| D5* | 0 | 25 | 500 | 505 | 505 | 220 | 95 | 75 | 70 | 45 | 25 |
| 6 | 10 | 100 | 520 | 530 | 120 | 45 | 25 | | | | |
| D6* | 0 | 100 | 510 | 510 | 510 | 125 | 78 | 50 | 40 | <25 | |
| 7 | 10 | 500 | 485 | 525 | 155 | 35 | <25 | | | | |
| D7* | 0 | 500 | 480 | 500 | 515 | 225 | 65 | 33 | 25 | | |

[1,2] Same as in Table I. [3] Same as in Table II. *Not an example of the invention.

7. The composition according to Claim 6 wherein the heavy metal dithiocarbamate is tris(N,N-di-n-butyldithiocarbamato)iron (III).

8. The composition according to Claim 6 wherein M is iron and each R individually is alkyl, aralkyl, aryl, alkaryl or cycloalkyl.

9. The composition according to Claim 6 wherein the ethylene polymer is polyethylene.

10. The composition of Claim 1 wherein the heavy metal of the organo complex is iron, zinc, copper and lead.

11. The composition of Claim 1 wherein the organo complex is an iron dithiocarbamate.

12. The composition of Claim 1 wherein the organo complex is a heavy metal dithiophosphate represented by the formula:

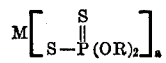

wherein R is a hydrocarbon radical, M is the heavy metal and $a$ is a whole number corresponding to the valence of M.

13. The composition of Claim 1 in the form of a shaped article.

14. The composition of Claim 1 in the form of a film.

References Cited

UNITED STATES PATENTS

| | | | |
|---|---|---|---|
| 3,607,828 | 9/1971 | Hussey | 260—45.75 N |
| 3,679,777 | 7/1972 | Lambert | 260—897 A |
| 3,219,566 | 11/1965 | Potts et al. | 204—159.2 |
| 3,663,662 | 5/1972 | Golike et al. | 260—897 A |

HARRY WONG, Jr., Primary Examiner

U.S. Cl. X.R.

204—159.2; 260—45.7 R, 45.8 SN, 45.75 R, 45.75 C, 45.75 N, 45.9 R, 45.95, Digest 43